(12) United States Patent
Zimmerman et al.

(10) Patent No.: US 8,850,764 B2
(45) Date of Patent: Oct. 7, 2014

(54) STRUCTURE ANTI-TORSION SYSTEM AND DEVICE, AND METHOD OF USE PROVIDING COMPRESSION AND TENSION SUPPORT

(75) Inventors: Steven Zimmerman, Linden, AL (US); Van T. Walworth, Lebanon, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 0 days.

(21) Appl. No.: 13/613,213

(22) Filed: Sep. 13, 2012

(65) Prior Publication Data

US 2013/0067839 A1    Mar. 21, 2013

Related U.S. Application Data (60) Provisional application No. 61/685,791, filed on Mar. 26, 2012, provisional application No. 61/573,943, filed on Sep. 15, 2011.

(51) Int. Cl.
| | |
|---|---|
| *E04B 1/26* | (2006.01) |
| *E04B 7/04* | (2006.01) |
| *F16B 9/02* | (2006.01) |
| *E04H 9/14* | (2006.01) |

(52) U.S. Cl.
CPC ......... *E04B 7/045* (2013.01); *E04B 2001/2684* (2013.01); *E04B 1/26* (2013.01); *E04B 2001/2696* (2013.01); *F16B 9/026* (2013.01); *E04B 1/2608* (2013.01); *E04H 9/14* (2013.01)
USPC ............................ 52/293.3; 52/92.2; 52/167.3

(58) Field of Classification Search
CPC .............. E04B 2001/2684; E04B 1/26; E04B 2001/3583; E04H 9/14
USPC .......... 52/92.1, 92.2, 23, 167.1, 167.3, 293.3, 52/698, 745.21, 848, 223.13
See application file for complete search history.

(56) References Cited

U.S. PATENT DOCUMENTS 5,448,861 A * 9/1995 Lawson ........................ 52/92.2
5,491,935 A * 2/1996 Coxum ......................... 52/92.2
(Continued)

FOREIGN PATENT DOCUMENTS

| JP | 2009-263897 | 11/2009 |
|---|---|---|
| JP | 2009-293214 | 12/2009 |

OTHER PUBLICATIONS

International Search Report for PCT/US2012/055803 mailed Feb. 5, 2013.

(Continued)

*Primary Examiner* — Jeanette E Chapman
*Assistant Examiner* — Daniel Kenny (57) ABSTRACT

A structure anti-torsion device includes a structural column. The structural column is positioned between adjacent studs of a structural stud wall construction and oriented vertically between the studs. A structural column lower end is fastened to a lower base plate which rests on a wall construction bottom plate. A pair of anchor bolts secured to a foundation extends through the bottom plate and the lower base plate and are fastened to the lower base plate. A structural column upper end is bolted using first and second bolts to an upper base plate. The first and second bolts cooperate through the upper base plate to connect the upper base plate to a double top plate of the wall construction such that the double top plate is connected by the upper base plate, the structural column, and the lower base plate to the foundation.

22 Claims, 9 Drawing Sheets

(56) References Cited

U.S. PATENT DOCUMENTS

| | | | |
|---|---|---|---|
| 6,014,843 A * | 1/2000 | Crumley et al. | 52/167.3 |
| 6,094,873 A | 8/2000 | Hoffman et al. | |
| 6,298,612 B1 * | 10/2001 | Adams | 52/167.3 |
| 6,679,023 B2 * | 1/2004 | Rizzotto | 52/653.2 |
| 7,216,467 B2 * | 5/2007 | Pott | 52/745.17 |
| 7,665,257 B2 | 2/2010 | Posey | |
| 2003/0182875 A1 * | 10/2003 | Hill | 52/92.1 |
| 2006/0254167 A1 | 11/2006 | Antonic | |
| 2007/0011965 A1 * | 1/2007 | Olson | 52/293.3 |

OTHER PUBLICATIONS

Written Opinion of the International Searching Authority for PCT/US2012/055803 mailed Feb. 5, 2013.

\* cited by examiner

STRUCTURE ANTI-TORSION SYSTEM AND DEVICE, AND METHOD OF USE PROVIDING COMPRESSION AND TENSION SUPPORT

CROSS-REFERENCE TO RELATED APPLICATIONS

This application claims the benefit of U.S. Provisional Application No. 61/685,791, filed on Mar. 26, 2012, which claims the benefit of U.S. Provisional Application No. 61/573,943, filed on Sep. 15, 2011. The disclosures of the above applications are incorporated herein by reference.

FIELD

The present disclosure relates to structural reinforcement members used in residential and commercial buildings to reinforce structural walls against weather including storm forces.

BACKGROUND

This section provides background information related to the present disclosure which is not necessarily prior art.

It is well known that hurricanes and tornados create storm wind forces capable of damaging and/or destroying standard residential and commercial constructions. Wind storm forces are known to remove and/or compromise the primary sealing systems of shingles, roofing, siding, and veneers. Furthermore, wind storm forces are well known to lift off entire roof systems and blow down and/or suck out walls.

In addition, wind storm forces are well known to impose substantial blowing rain events which become influent to structures even before the construction components fail and/or are compromised. Beyond the obvious influent opportunities resulting from broken windows and/or other compromised construction components, wind storm events are known to blow rain into and through functioning vents of an intact roof system, thus creating water damage even though little or no actual structural damage occurs.

There are numerous representatives of art resident in the patent records that deal with various hurricane or tornado storm wind forces that claim use of any one of several strengthening components. However, one of the major problems with all of these art examples is that they do not lend themselves to our do-it-yourself culture and do not lend themselves to be cost effective for the mass consumption public at large.

Another problem with all of the known art examples is that none of these patent records for structural strengthening systems include a means to provide a secondary sealing system for the structure in the event that primary sealing system of shingles and/or siding of the structure are compromised.

There are some references of art in the patent records related to systems that minimize water influent damage from wind storms, but once again none of these art examples lend themselves to our do-it-yourself culture and do not lend themselves to be cost effective for the mass consumption public at large. In addition, none of these art examples provide any strengthening enhancements to improve the structural integrity of the construction. Furthermore, none of these known sealing systems provide a secondary sealing system in the event that the primary sealing system is compromised. The closest known art form is a product referred to as "Go Bolt" which is a threaded rod assembly. The threaded rod assembly does provide reasonable resistance to lifting forces or tension forces. However, the threaded rod assembly provides little or no compressive support due to the buckling nature of threaded rods. In addition, the threaded rod assembly provides no resistance to torsion forces. Furthermore, the threaded rod assembly does not provide a means to fasten and/or secure wall construction materials to the assembly, and provides no secondary sealing features in the event that the primary sealing system is compromised.

SUMMARY

This section provides a general summary of the disclosure, and is not a comprehensive disclosure of its full scope or all of its features.

The subject invention provides an improved system for constructing a typical residential or commercial structure and/or retrofitting a similar existing structure in such a way that a series of novel construction components are employed to cooperate with standard construction materials so as to enhance the structural integrity of the building when subjected to destructive wind forces such as those commonly associated with hurricanes and tornados. The resultant improved strength of the structure is thusly increased significantly beyond what the standard construction materials were capable of on their own.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The subject invention overcomes the well-known problems in such a way that those skilled in the art will readily recognize and appreciate. Furthermore, the subject invention provides features and capabilities for many other applications beyond the embodiments disclosed, which those skilled in the art will readily recognize also embody the spirit of the subject invention.

One preferred embodiment of the subject invention relates to a typical residential stick-built or prefabricated home construction which is enhanced and substantially strengthened in specific areas of the structure to better withstand the destructive wind forces of hurricanes and tornados. The preferred embodiment also provides a secondary water tight seal which is utilized to maintain a reasonable barrier from influent storm water and blowing rain in the event that the primary water barrier via the shingles and/or siding is compromised during the storm.

It is understood that the secondary water seal requires that the structure must maintain a reasonable structural integrity; therefore, a series of structural enhancements are employed for this purpose and to further maintain structure integrity against storm wind forces. The structural enhancement system is comprised of several subsystems which all work together to collectively enhance the structural integrity of the structure. These subsystems include but are not limited to the following:

Anchoring System
Wall Reinforcement System
Rafter/Joist Tie-Down System
Wind-Beam System
Diaphragm Reinforcement System
Wall Sheeting System
Roof Decking System
Venting System
Window/Door Protective Seal System
Safe Room System Those skilled in the art will readily understand that while many typical structures will require all of the listed subsystems to enhance the structure adequately against storm winds, some complex structures may require additional specialized subsystems, while less complex structures may only require a partial list of the subsystems. A brief description of the wall reinforcement system follows. The wall reinforcement system is a subsystem which integrates into a typical stud type wall construction to provide significant enhanced compression and tension strength to the wall. A typical stud built wall may have appropriate compressive strength but it has very little tension strength, and therefore is susceptible to lift forces during storm winds. A specialized structural member is installed in the stud wall at intervals along the wall and/or at wall corners such that the member is substantially stronger than the typical stud wall components and is capable of being firmly and strongly attached to the anchoring system. The wall reinforcement system provides a strong and solid connection from the bottom plate of the stud wall all the way to the top plate of the stud wall, where it is again firmly and solidly attached and terminated.

Figure 1:
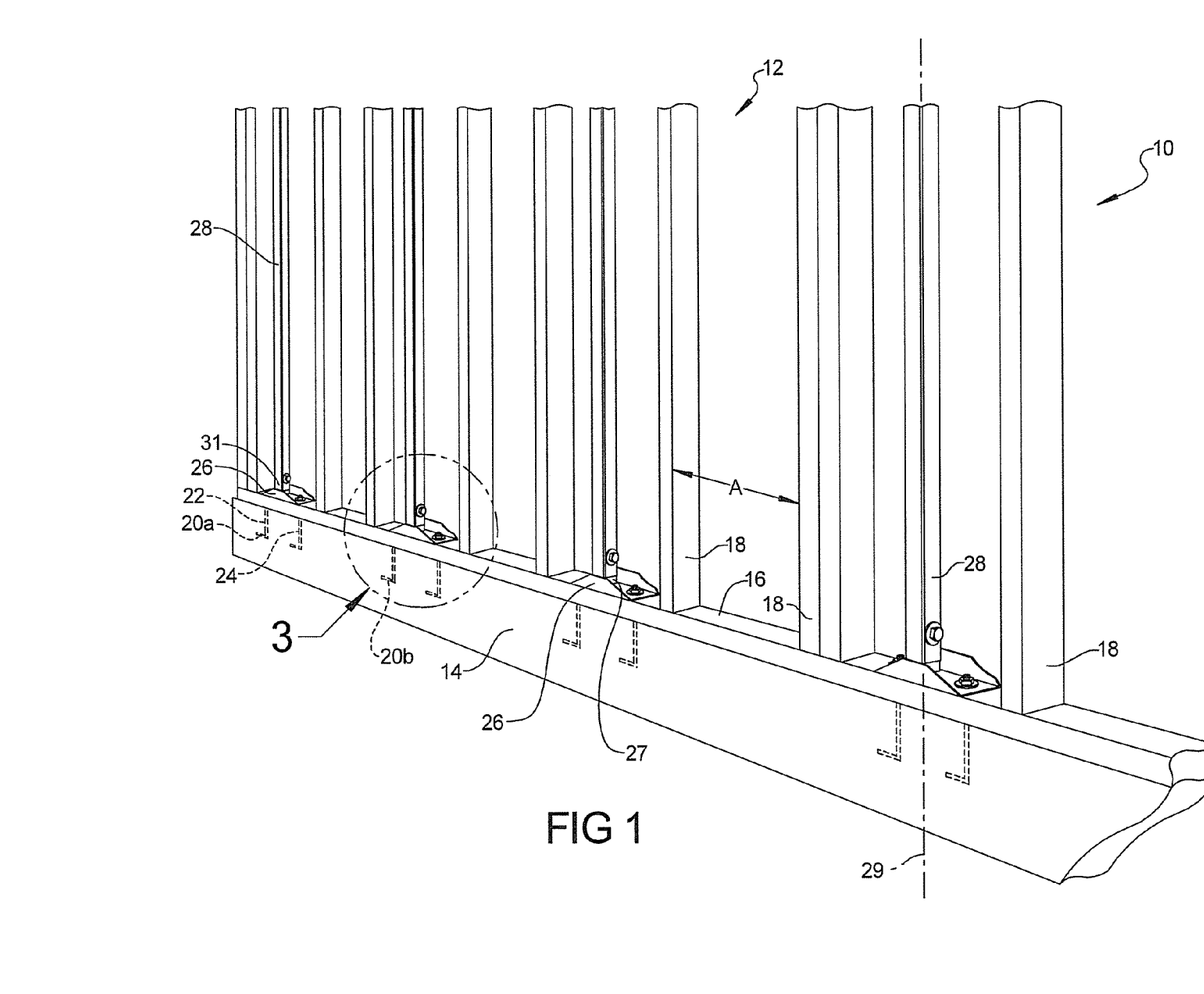
FIG. 1 is a front right perspective view of a lower portion of a wall construction having components of a wall reinforcement anti-torsion system of the present disclosure.

Referring to FIG. 1, a wall reinforcement anti-torsion system 10 is provided in a typical wall construction 12. Wall construction 12 includes a foundation 14 supporting a horizontal plate 16 from which vertically extend multiple steel or wood studs 18 which are normally sequentially positioned at a repeating spacing "A". In addition to the materials of wall construction 12, anti-torsion system 10 provides multiple pairs of anchor bolts, such as anchor bolt pairs 20a, 20b in foundation 14, each partially extending out of foundation 14 and located so as to engage/receive a lower base plate 26 of a lower base plate assembly 27 of one preferred embodiment of the subject invention. Each pair of anchor bolts, such as anchor bolt pair 20a, represent "at least two" juxtaposed fasteners or anchor bolts 22, 24 straddling a structural column 28 connected to the lower base plate 26 of the lower base plate assembly 27. The juxtaposed fasteners or anchor bolts 22, 24 provide anti-torsion support to the single location of each structural column 28 and are equally spaced with respect to a longitudinal axis or centerline 29 of a square or rectangular shaped tube defining each structural column 28. Positioning the anchor bolts 22, 24 oppositely with respect to longitudinal axis 29 prevents torsional, axial rotation or bending of structural column 28. The lower base plate assembly 27 is connected at a lower end 31 of structural column 28 and is designed to cooperate with the anchoring system.

Those skilled in the art will appreciate that the structural column 28 can be made of metal, one or more polymeric materials, composite materials, and other materials that can be used for structural applications. Those skilled in the art will appreciate that the structural column 28 can have other cross sectional shapes other than square or rectangular, such as but not limited to round, half-round, hexagonal, or other shapes functional to manufacture a structural column. It will also be appreciated that the structural column may either be solid or hollow. One preferred embodiment is shown having a hollow tube with base plate elements inserted telescopically into the hollow. It should be evident that the structural column may be solid and inserted into the base plate elements. It also should be evident that the base plate elements and the structural column can be fastened together using numerous practical methods other than the exemplary embodiments shown, such as welding the pieces to fit, bolted fastening tabs, and/or interlocking snap fits, or the like.

Each structural column 28 has one of the lower base plates 26 fastened to one pair of anchor bolts 20 at the lower end 31 of the structural column 28 to secure the structural column 28 to the foundational elements. Each structural column 28 extends from the lower portions of the typical wall construction 12 proximate to the plate 16 to the upper portions of the wall construction 12 which will be shown and described in reference to FIG. 2. Each first base plate 26 is fitted with at least two receiving holes, juxtaposed and straddling the structural column 28, through which anchoring methods cooperate and attach to secure the lower end of the column assembly to foundation structures. Because the anchor bolts 20 are fastened using nuts to the first base plates 26, the anchor bolts and nuts also limit displacement of the wall studs that are normally nailed in place due to vertical lift forces applied to the wall during high wind conditions. The receiving holes may be round, square, rectangular, or other shape appropriate to facilitate fastening means in a specific application.

Figure 5:
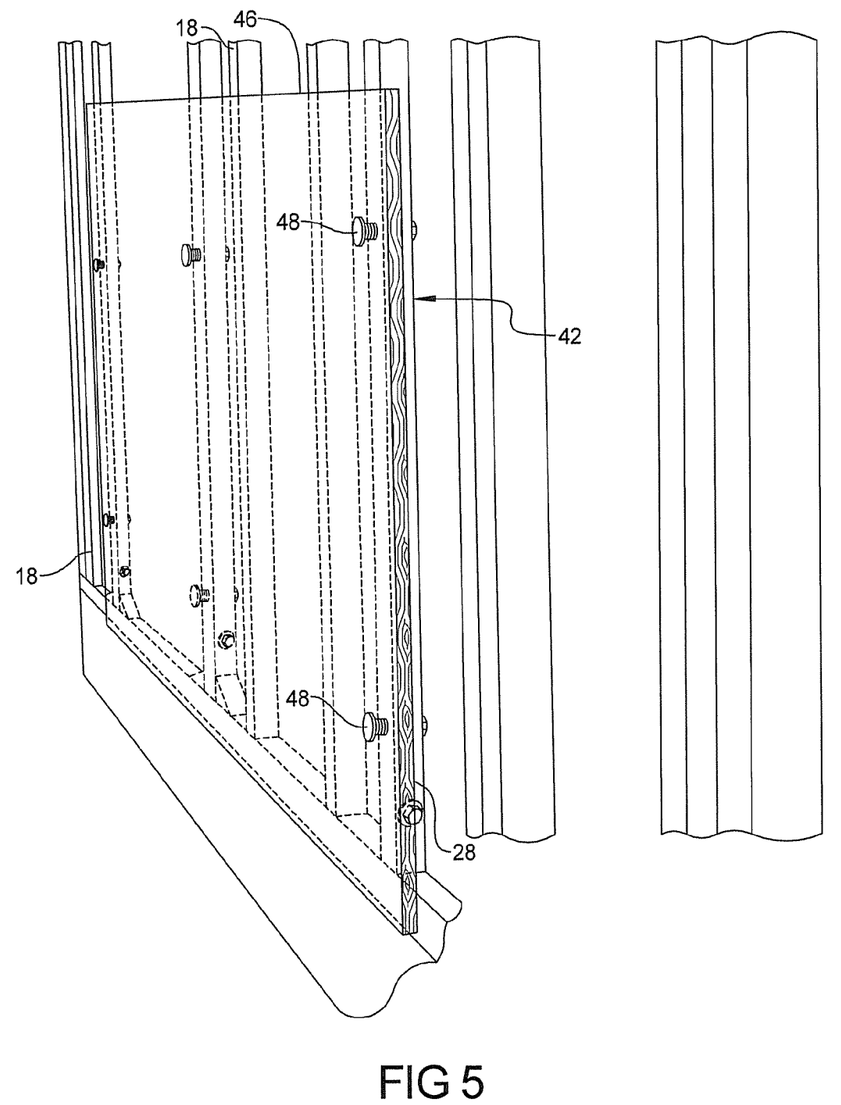
FIG. 5 is a front right perspective view similar to FIG. 1, further showing sheeting applied to the wall construction.

Referring to FIG. 2 and again to FIG. 1, each structural column 28 extends upward to a upper base plate 30 having fasteners 32 extending through the upper base plate 30 and a double top plate 34 of the wall construction 12 to secure a truss bracket assembly 36. The truss bracket assembly 36 secures a truss 38 of a plurality of roof system elements 40, tying them directly to the structural column 28. A wall siding (shown in reference to FIG. 5) covering the span between the lower plate 16 and the upper double top plate 34 has an inner surface substantially parallel and butted up against an outward facing planar surface 42 of the structural columns 28. The planar surface 42 of each structural column 28 is specifically positioned so as to allow secure fastening support of the wall construction siding (shown in FIG. 5) to the planar surface 42 of the structural column 28 via fastening screws (shown in FIG. 5) or other typical attachment methods. As a result, the entire structure is directly tied together and fastened to the foundational elements through the structural column 28. Again, due to the use of bolts fastened using nuts to the upper base plates 30, the bolts and nuts limit displacement of the wall studs and double top plate that are normally nailed in place due to vertical lift forces applied to the wall during high wind conditions.

Those skilled in the art will also recognize that alternative bolted fastening methods exist for attaching the sheeting to the structural column such as tapped holes in the structural column 28 to receive a bolt. Another bolted alternative includes the use of a standard nut clipped or attached to the structural column 28 to receive a bolt. A further bolted method for fastening the sheeting to the structural column 28 includes any one of several self-tapping screws. Still another fastening method includes using a bracket that bolts to the sheeting and separately bolts to the structural column 28. Any of these bolted fastening methods will satisfy the spirit of securing the sheeting directly to the structural column. It will also be appreciated that the bolted fasteners may require a large head and/or a washer device to prevent the head of the fastener from pulling through the sheeting when storm wind forces are applied to the structure. The large head fasteners may be standard carriage bolt type fasteners or other standard head bolts with washer devices to effectively enlarge the bearing surface of the head of the fastener.

The contractor is thus provided with a new method to be able to lay out the wall construction 12 on the floor prior to raising the wall construction 12 so that all cooperating fastener holes are easily located and formed prior to raising and positioning of the wall construction 12. It will be readily understood by those skilled in the art that the method of assembly on the floor will facilitate savings in time and money compared to the same installation of the subject invention after the wall construction 12 is raised into position. The second or upper base plate 30 is fitted with at least two receiving holes, juxtaposed and straddling the structural column 28, through which fastening methods attach and secure construction elements such as truss systems, joists, rafters, gables, and other appropriate construction elements.

Figure 6:
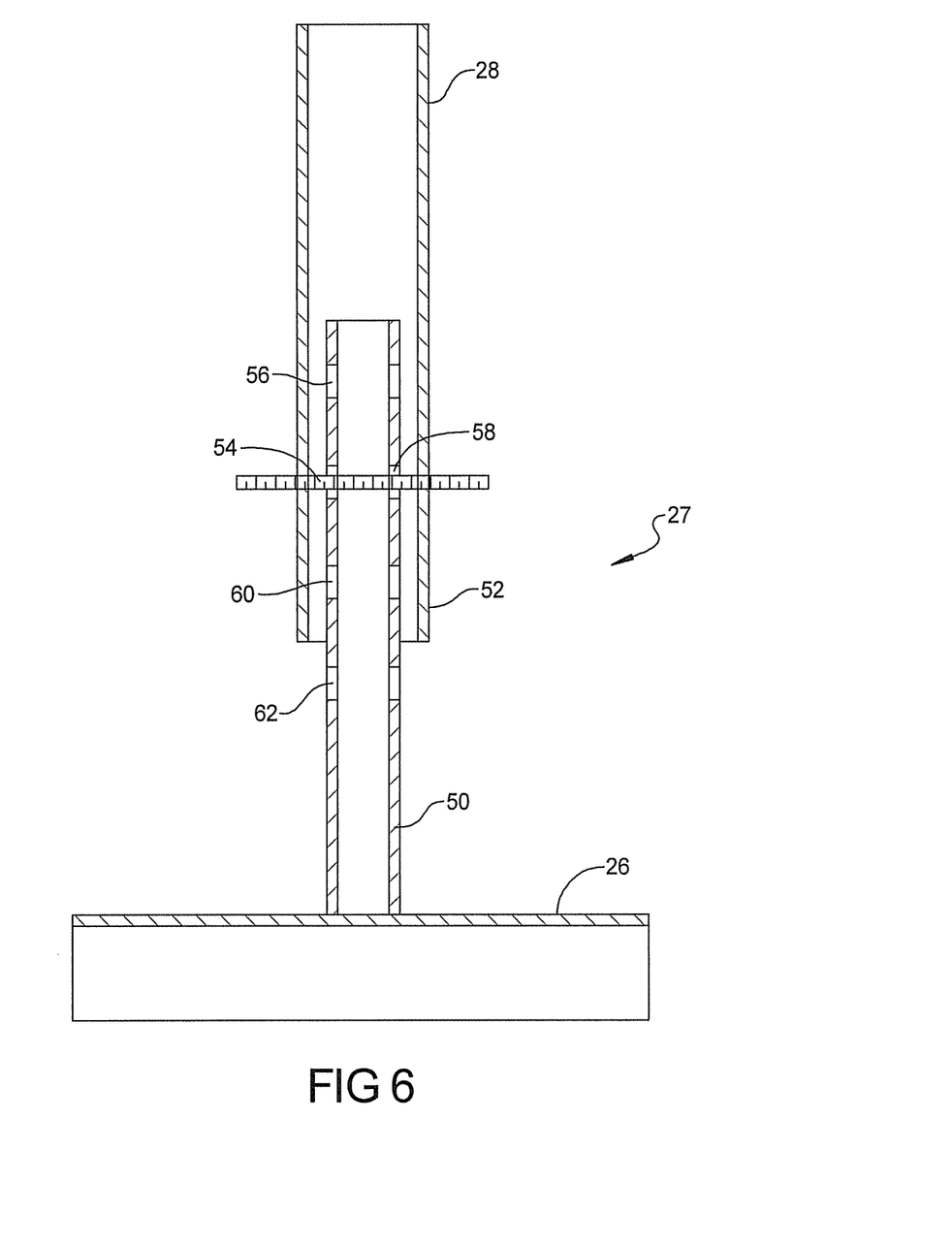
FIG. 6 is a cross sectional front elevational view taken at section 6 of FIG. 3.

Referring to FIG. 3 and again to FIG. 1, a full assembly representation of a lower wall base plate assembly 27 with the pair of anchor bolt fasteners 22, 24 is represented as though anchor bolt fasteners 22, 24 were encased in concrete foundational elements and extending up through lower wall plate 16 and the lower wall construction plate 26. The anchor bolts 22, 24 straddling the centerline 29 of structural column 28 either extend through the lower wall construction plate 26 or a fastener is bolted through the lower wall construction plate 26 to secure the lower wall base plate assembly 27 of the structural column 28 to the foundation 14. Anchor bolt nuts 43, 43' are connected to threaded extending portions of each of the anchor bolts 22, 24 to secure the lower base plate assembly 27 and thereby the structural column 28 to the base plate 16 and thereby to the foundation 14. A bolted connector or similar fastener 54 and nut 55 connect the structural column 28 to lower base plate 26 which is shown and described in greater detail in reference to FIG. 6.

Figure 2:
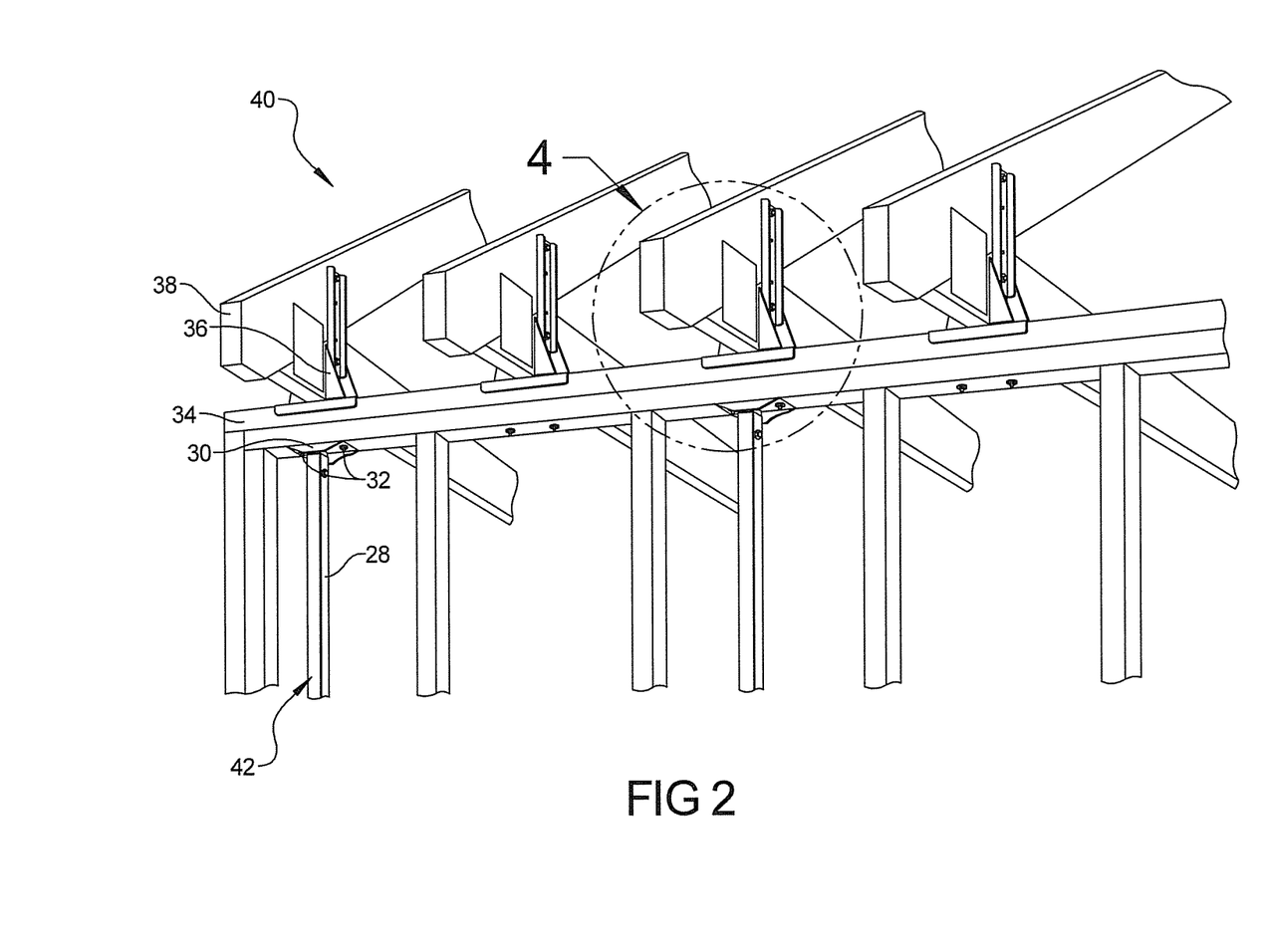
FIG. 2 is a front right perspective view of an upper portion of the wall construction of FIG. 1.
Figure 4:
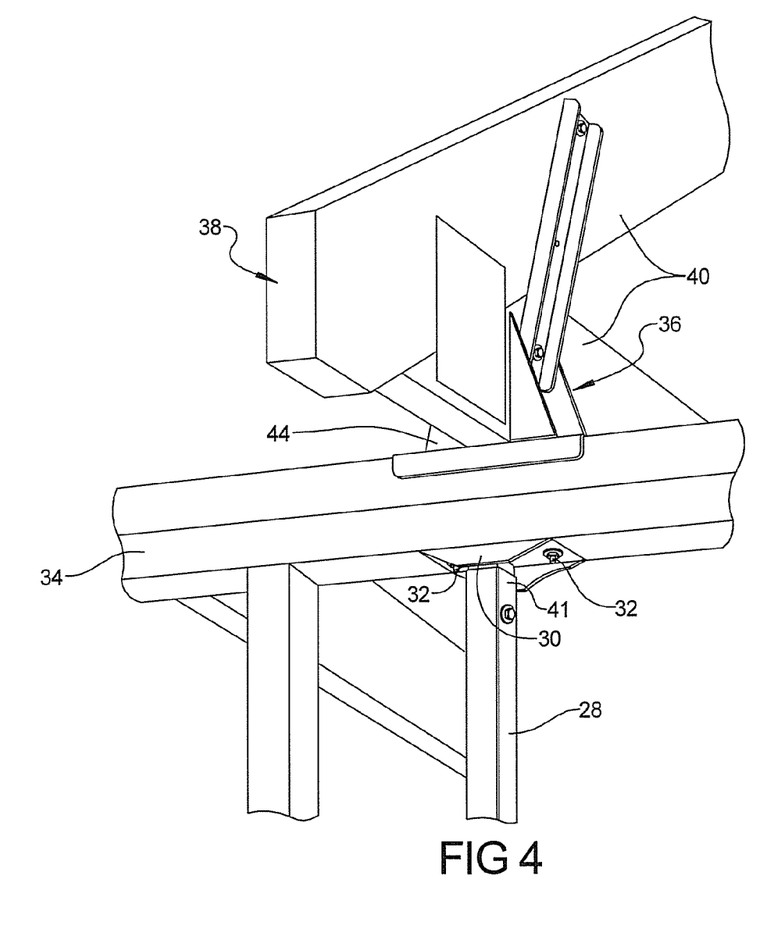
FIG. 4 is a front right perspective view of area 4 of FIG. 2.

Referring to FIG. 4 and again to FIG. 2, a close up view shows an upper end 41 of the structural column 28 extended upward to one of the upper base plates 30 where the fasteners 32 cooperate through the double top plate 34 of the wall construction 12 to secure the truss bracket assembly 36. The truss bracket assembly 36 secures the truss 38 at a truss connection 44, and the roof system elements 40, tying them directly to the structural column 28.

Referring to FIG. 5 and again to FIGS. 1-4, in one preferred embodiment a wall sheeting 46 is fastened and secured using fasteners 48 to the planar faces 42 of the structural columns 28 such that the stability and anti-torsion characteristics of the structural columns 28 are transferred into the wall sheeting 46, thereby increasing the structural integrity of the wall sheeting 46. As a result, the entire structure is directly tied together and fastened to the foundational elements through the structural column 28. This view also hints at the method provided to the contractor to be able to lay out the wall construction on the floor prior to raising the wall construction so that cooperating fastener holes are easily located and formed prior to raised positioning of the wall construction. It will be readily understood by those skilled in the art that the method of assembly on the floor will facilitate savings in time and money compared to the same installation of the subject invention after the wall construction is raised into position.

In addition to providing structural integrity to the wall sheeting, fastening the sheeting to the structural columns 28 secures adjacent sheets such that adjacent edges of sheeting can be sealed during assembly and remain sealed to establish a secondary wall sheeting sealing system resisting influent water during wind storms. Secondary sealing systems may include overlapping edges, tape sealed edges, caulk filled joints, rubber sealed joints, epoxy applications, urethanes, or any one of numerous sealing methods or combinations of sealing methods. The use of any of the referenced sealing methods have little, if any, ability to enhance the structural integrity of the structure they are applied upon, and thus, such secondary sealing systems fail to seal when the structure they are applied upon is compromised. Therefore, the present invention establishes structural integrity for the structure and therefore establishes a secondary sealing system using sealing methods that otherwise do not provide structural integrity in and of themselves.

Figure 3:
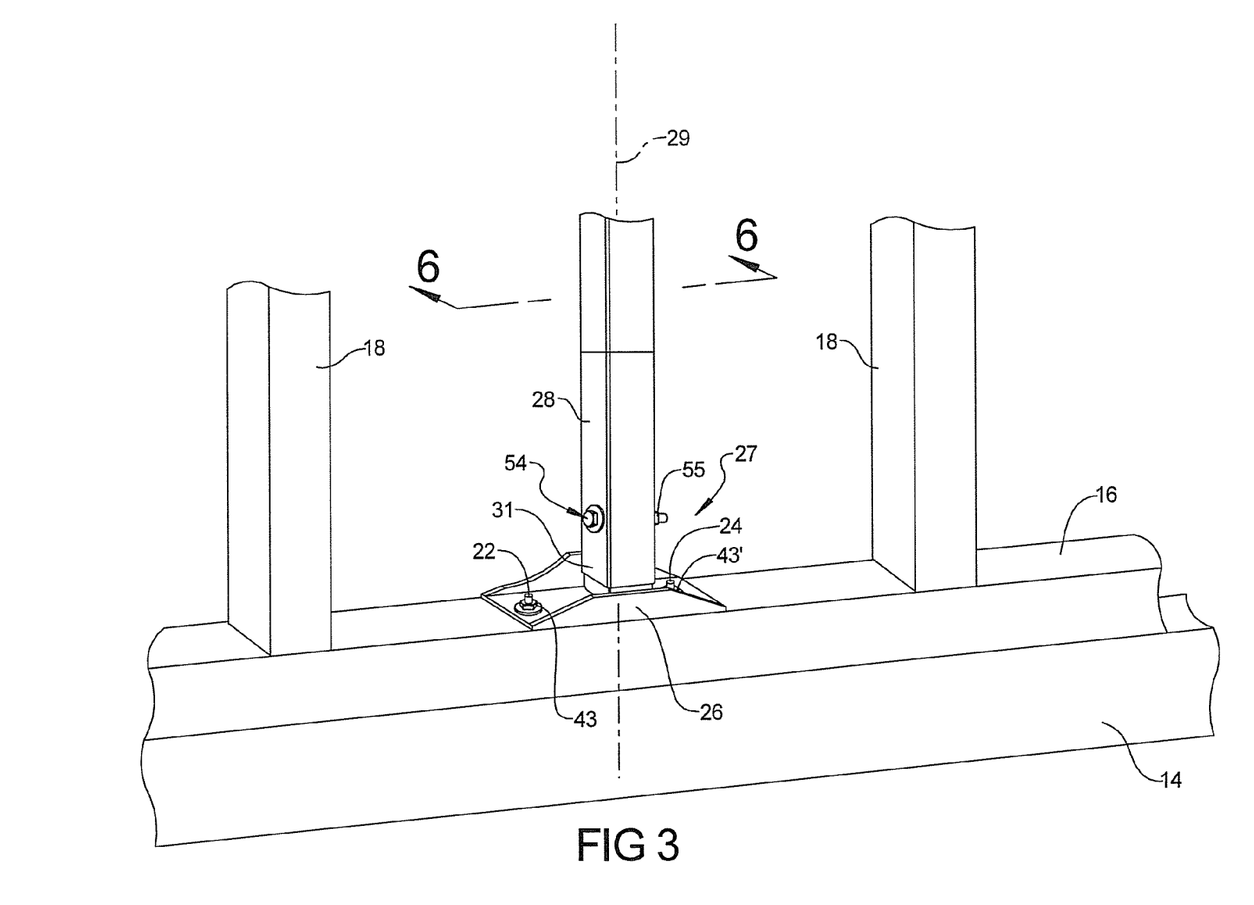
FIG. 3 is a front left perspective view of area 3 of FIG. 1.

Referring to FIG. 6 and again to FIGS. 1 and 3, a schematic view of one preferred embodiment of a structural column 28 connection with the lower base plate assembly 27 includes a telescopically adjustable column 50 of the lower base plate assembly 27 selectably connected at a lower end 52 of structural column 28. Telescopically adjustable column 50 is fixed to lower base plate 26 and is connected to lower end 52 via a bolted connector 54 oriented transverse to the centerline 29 of structural columns 28 and received in apertures 56, 58 of the lower end 52 and through one of multiple bolt receiving apertures 56, 58, 60, 62 (connection is shown for example via bolt receiving aperture 58) created in telescopically adjustable column 50. Multiple bolting options are therefore provided to allow for height adjustments of the lower base plate assembly 27. It will be evident that the height adjustment feature can be applied to either the lower base plate assembly or the upper base plate assembly, or both assemblies as may be required in a specific application. The transverse orientation of bolted connectors 54 limit displacement of the wall studs, bottom plate and double top plate that are normally nailed in place due to vertical lift forces applied to the wall during high wind conditions. It should also be evident that the bolted connector 54 may also be replaced with a shaft-type pin, a rod, a shoulder bolt, or any one of many similar devices to accomplish the spirit of the embodiments shown.

Figure 7:
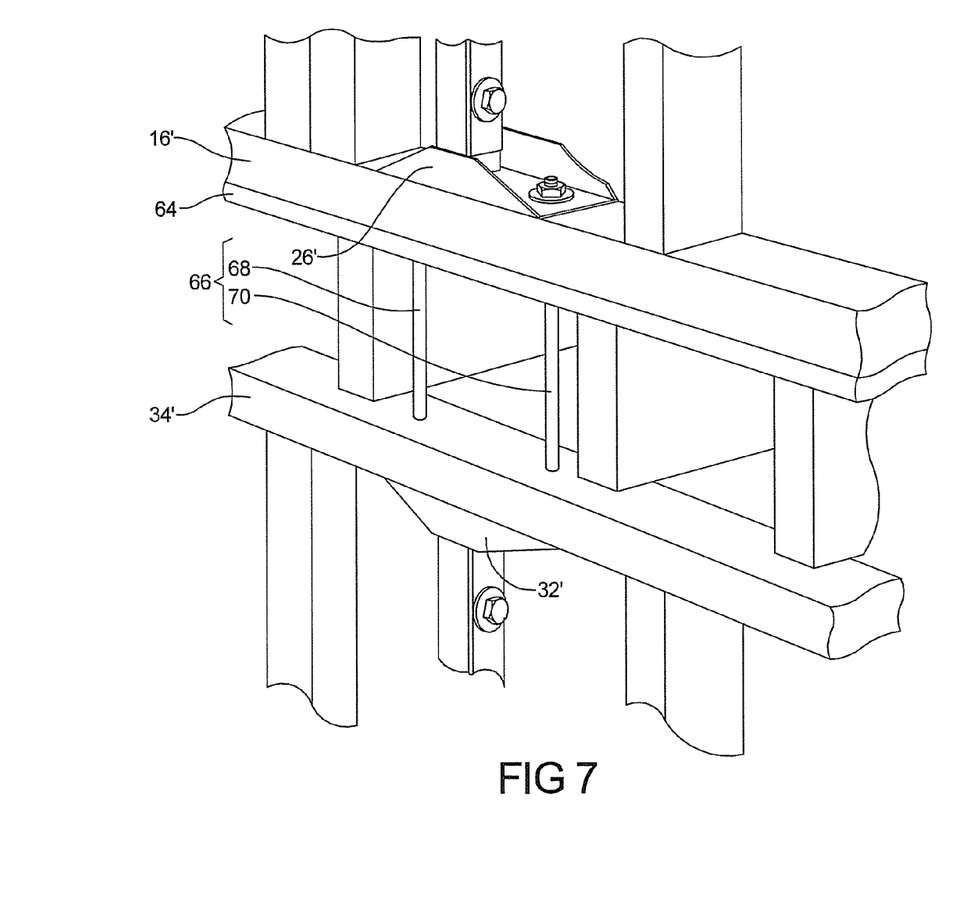
FIG. 7 is a front right perspective view of junction between a lower floor portion and an upper floor portion of a wall construction.

Referring to FIG. 7 and again to FIGS. 1-2, for connecting between different floor levels, according to one preferred embodiment the upper base plate 30' of a lower level wall double top plate 34' is connected to the lower base plate 26' of an upper level bottom plate 16' and through a floor sheeting 64 of the upper level to accommodate a secure continuous load path between multiple level constructions. A bolted connection 66 can be used to couple the upper base plate 30' to the lower base plate 26'. Bolted connection 66 includes first and second extended length bolts 68, 70 which replace anchor bolts 22, 24 and fasteners 32.

Figure 8A:
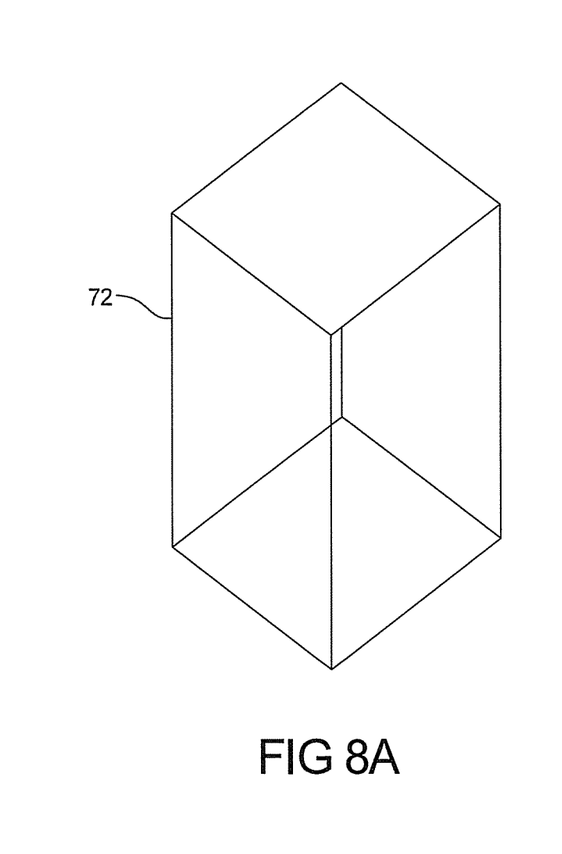
FIG. 8A is a top perspective schematic view of a construction prior to application of torsion forces.
Figure 8B:
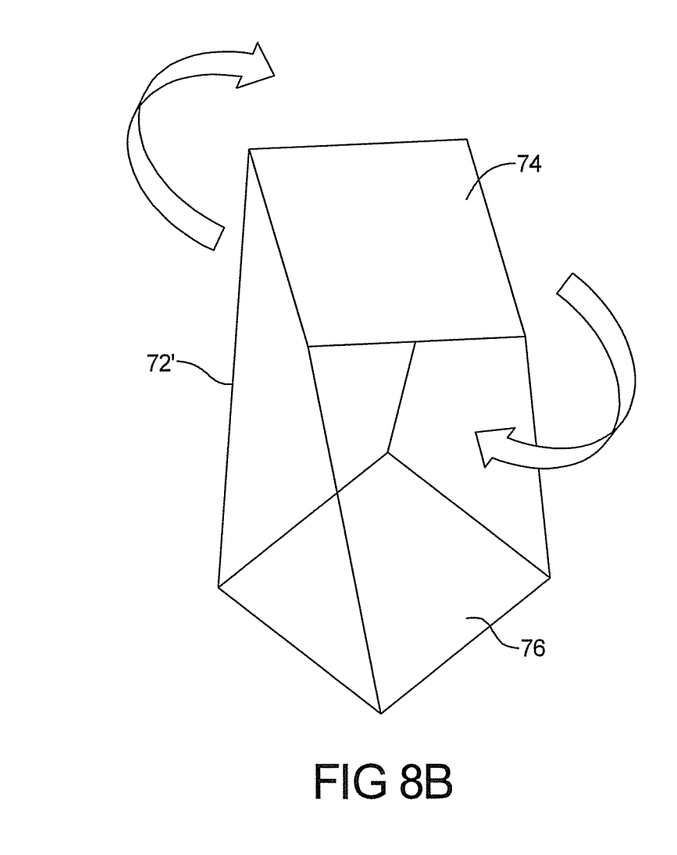
FIG. 8B is a top perspective schematic view of the construction of FIG. 8A following application of torsion forces.

Referring to FIG. 8A and again to FIGS. 1-2, a schematic representation of a construction 72 prior to subjection to torsion forces is shown. Referring to FIG. 8B, a schematic shows the construction 72' after it has been subjected to torsion forces. Torsion forces are commonly associated with tornadic and strong storm winds such that an entire structure can be effectively twisted in response to the torsion forces. The upper portions 74 of the structure will twist relative to the lower portions 76 of the structure because generally the lower portion 76 of the structure is fastened to foundational elements allowing the walls to effectively twist and flex as the upper portion 74 of the structure responds to torsion. The subject invention overcomes the inherent weakness in common construction to yield to torsion forces by providing at least two fasteners (for example fasteners 32) straddling each structural column 28. Furthermore, the entire structure of one preferred embodiment is effectively unitized increasing the structural integrity of the entire structure against torsion forces.

Figure 9A:
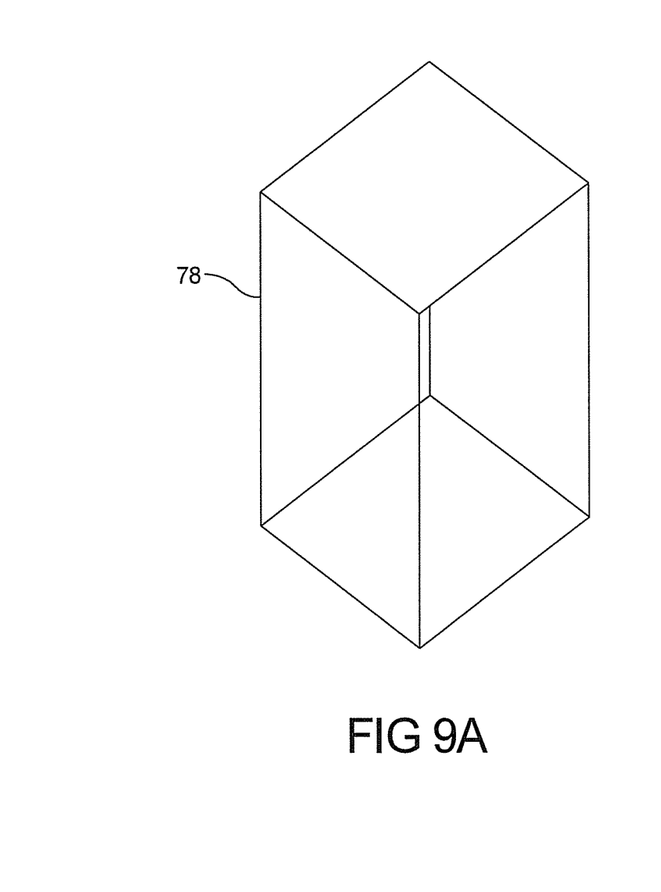
FIG. 9A is a top perspective schematic view of a construction prior to application of rhombus forces.
Figure 9B:
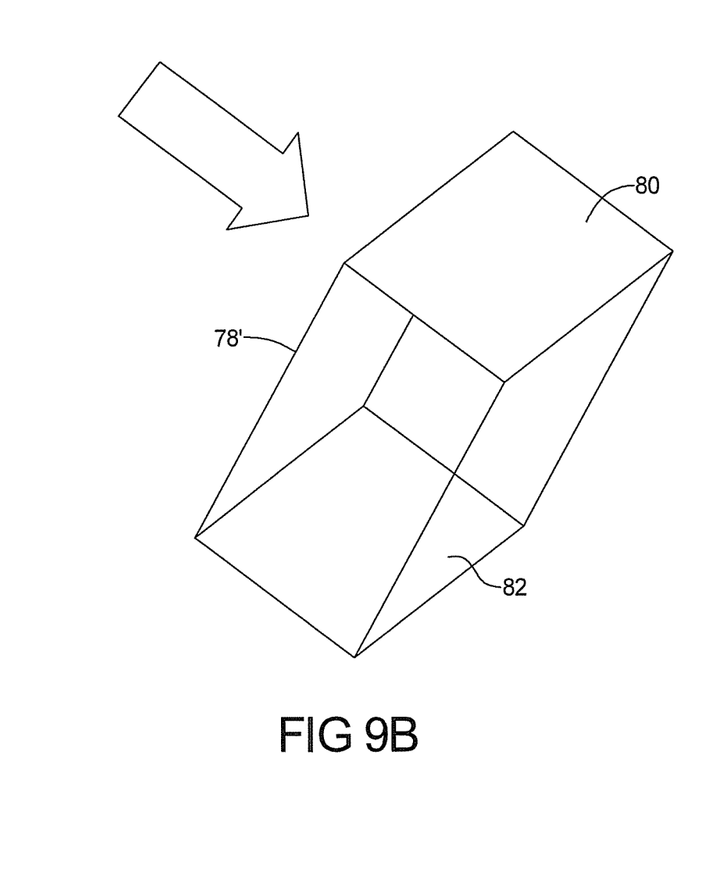
FIG. 9B is a top perspective schematic view of the construction of FIG. 9A following application of rhombus forces.

Referring to FIG. 9A, a schematic representation is provided of a structure or construction 78 prior to being subjected to rhombus forces. Referring to FIG. 9B, a schematic is also shown showing the construction 78' after it has been subjected to rhombus forces. Rhombus forces are commonly associated with tornadic and strong storm winds such that an entire structure can be effectively pushed laterally in response to side load forces. The upper portions 80 of the structure will shift laterally relative to the lower portions 82 of the structure 78' because generally the lower portion 82 of the structure is fastened to foundational elements allowing the walls to effectively rhombus and flex as the upper portion of the structure responds to rhombus forces. The subject invention overcomes the inherent weakness in common construction to yield to rhombus forces by providing at least two fasteners straddling the structural column. Furthermore, the entire structure of the preferred embodiment is effectively unitized increasing the structural integrity of the entire structure against rhombus forces.

The wall reinforcement anti-torsion system 10 as defined by the subject invention is a subsystem which integrates into a typical stud type wall construction to provide significant enhanced compression and tension strength to the wall. A typical wood or metal stud built wall may have appropriate compressive strength but it has very little tension strength, and therefore is susceptible to lift forces during storm winds. In addition, the wall reinforcement anti-torsion system 10 of the subject invention provides resistance to forces that result in torsion and/or rhombus conditions. A specialized structural member, structural column 28, is installed in the stud wall at intervals along the wall and/or at wall corners such that the member is substantially stronger than the typical stud wall components and is capable of being firmly and strongly attached to the anchoring system or foundation 14. The Figures depict embodiments wherein sheeting 46 is bolted to the specialized wall member, structural column 28, anchored to the foundation 14 and bolted through the double top plate 34 to the rafter/joist tie-down system. The wall reinforcement anti-torsion system 10 provides a strong and solid connection from the bottom plate of the stud wall all the way to the top plate 34 of the stud wall, where it is again firmly and solidly attached and terminated. An embodiment is also provided wherein the structural column 28 is bolted through the top plate of the wall to roof elements. The subject invention also applies to multi-story structures by employing bolted connections across floor joist construction. A further embodiment provides a multi-story construction wherein wall reinforcement structural columns 28 on upper and lower floors are bridged and connected via bolted connectors across the floor joist. The subject invention effectively unitizes the entire wall construction by employing the wall reinforcement anti-torsion system 10 wall reinforcement anti-torsion system 10 to cooperate and integrate the respective features of the Anchoring System and the Rafter/Joist Tie-Down System and with the Wall Sheeting System and with the Diaphragm Reinforcement System and/or a Safe Room System.

The subject invention relates to a device wherein a first base plate assembly is fastened to the lower end of a structural column. Said structural column extends from the lower portions of a typical wall construction to the upper portions of the wall construction. A second base plate is fastened to the upper end of the structural column. The base plates and the structural column form an assembly which performs as a unitized structure in the wall construction.

The result of the completed installation of the structural column assembly provides a secure anchoring system for all construction elements fastened and anchored to the structural column, effectively extending an anchoring method to the foundational construction for the entire building.

The present invention includes base plates formed from stampings which assemble easily to the ends of the structural column and provide some tolerance adjustment to correspond to typical wall construction variances. The present invention also includes a variety of interchangeable base plates to facilitate different construction applications. Those skilled in the art will appreciate that the structural components disclosed and discussed herein can be interchanged or replaced by base plates that are made using other manufacturing techniques, including but not limited to welding, forging, casting, bending, and the like.

The present invention further includes positioning one planar surface 42 of the structural column 28 such that it will be located effectively flush with a designated wall construction surface. The wall construction surface and material can be easily fastened to the structural column 28 and secured such that torsion forces resident in the structural column 28 are transferred and/or extended to the wall construction material.

Alternate embodiments include permanently fastened base plates and/or custom fit base plates. Another alternate embodiment includes an adjustable length structural column to allow for different wall construction measurements.

The subject invention provides an anti-torsion column used in construction of residential homes and other buildings. Said anti-torsion column provides a fastening system of at least two fasteners juxtaposed to the column on each side. Said fasteners provide resistance to torsion forces which would try to twist or wrench the column about its own axis. The anti-torsion column further provides compression support for structural enhancement of loadbearing applications. The anti-torsion column further provides a positive tension device resisting lifting forces of anything anchored to the anti-torsion column.

The anti-torsion column further provides a planar surface parallel to a designated wall construction surface such that the wall construction material can be secured to the planar surface of the anti-torsion column—which extends resistance to torsion forces into the wall construction which heretofore had little or no positive anti-torsion resistant abilities.

The subject invention provides the user with a method of use improving typical construction techniques. Said method of use is demonstrated by the contractor being able to layout the wall construction of a typical frame building using typical methods such as constructing the wall on the floor and then raising the wall section up into place. The subject invention provides the contractor the method and ability to lay out the wall and structural column elements together such that when the wall is raised into place, all of the locations for the subject invention will be known and prepared in advance with appropriate fitted holes in the lower wall plate and the upper double plate for securing the entire structure together.

The subject invention also provides that the structural enhancements can be applied to new construction as well as retrofitting existing structures so as to improve structural integrity and secondary sealing against wind forces such as those associated with hurricanes and/or tornados.

The subject invention further provides that the structural enhancements cooperate with standard construction components so as to improve the structural integrity of the construction components beyond their original capabilities against wind forces such as those associated with hurricanes and/or tornados, and further to provide a secondary sealing system to resist influent water in the event that the primary sealing system is compromised.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structure anti-torsion device, comprising:

a structural column, the structural column positioned between adjacent studs of a structural stud wall construction and oriented vertically between the studs;

a lower end of the structural column is fastened to a pair of anchor bolts secured to a foundation, the anchor bolts straddling the structural column to prevent torsional rotation of the structural column;

a lower base plate assembly including a telescopically adjustable column fixed to a lower base plate wherein the anchor bolts extend through the lower base plate, the telescopically adjustable column being connected to the structural column using at least one fastener oriented transverse to a centerline of the structural column and received in an aperture created through the lower end and through one of multiple fastener receiving apertures of the telescopically adjustable column;

an upper end of the structural column is fastened using first and second fasteners to a double top plate of the wall construction such that the double top plate is connected by the structural column to the foundation; and wall siding supported on the structural column wherein the structural column includes a planar surface aligned parallel with and flush to the wall siding and an outside face of the adjacent studs, the lower base plate, and the double top plate of the wall construction such that the wall siding is butted up against the planar surface and each of the adjacent studs, the lower base plate, and the double top plate; and wherein the planar surface of the structural column defines multiple holes that receive multiple fasteners to fasten the wall siding to the planar surface of the structural column.

2. The structure anti-torsion device of claim 1, wherein the pair of anchor bolts extend through the bottom plate and the lower base plate and are fastened to the lower base plate.

3. The structure anti-torsion device of claim 1, wherein the upper end of the structural column is fastened using first and second fasteners to an upper base plate.

4. The structure anti-torsion device of claim 3, wherein the first and second fasteners extend through the upper base plate to connect the upper base plate to the double top plate of the wall construction.

5. The structure anti-torsion device of claim 1, wherein:
the lower end of the structural column is fastened to the lower base plate which rests on a bottom plate of the wall construction;
the upper end of the structural column is fastened using first and second fasteners to an upper base plate; and
the first and second fasteners extending through the upper base plate act to connect the upper base plate to the double top plate of the wall construction, such that the double top plate is connected by the upper base plate, the structural column, and the lower base plate to the foundation.

6. The structure anti-torsion device of claim 5, wherein the structural column and the upper and lower base plates are a metal, one or more polymeric materials, or a composite material.

7. The structure anti-torsion device of claim 1, wherein the structural column is a rectangular hollow metal tube internally receiving the telescopically adjustable column.

8. The structure anti-torsion device of claim 1, wherein a shape of the structural column is selected from round, half-round, or hexagonal, and is one of solid or hollow.

9. A structure anti-torsion device, comprising:
a structural column, the structural column positioned between adjacent studs of a structural stud wall construction and oriented vertically between the studs;
a lower end of the structural column fastened to a lower base plate which rests on a bottom plate of the wall construction;
a pair of anchor bolts secured to a foundation and extending through the bottom plate and the lower base plate and fastened to the lower base plate;
a telescopically adjustable column fixed to the lower base plate and having multiple apertures, one of the multiple apertures receiving a fastener also received in an aperture created in the structural column perpendicular to an axis of the structural column thereby providing for height adjustment of the structural column;
an upper end of the structural column bolted using first and second bolts to an upper base plate, the first and second bolts cooperating through the upper base plate to connect the upper base plate to a double top plate of the wall construction such that the double top plate is connected by the upper base plate, the structural column, and the lower base plate to the foundation;
a wall siding supported on the structural column wherein the structural column includes a planar surface aligned parallel with and flush to the wall siding and an outside face of the adjacent studs, the bottom plate of the wall construction, and the double top plate of the wall construction such that the wall siding is butted up against the planar surface and each of the adjacent studs, the bottom plate, and the double top plate; and
wherein the planar surface of the structural column defines multiple holes that receive multiple fasteners to fasten wall sheeting to the planar surface of the structural column.

10. The structure anti-torsion device of claim 9, wherein the anchor bolts are oppositely positioned with respect to a longitudinal central axis of the structural column to resist axial rotation of the structural column.

11. The structure anti-torsion device of claim 10, further including: a truss bracket assembly that is vertically aligned with the structural column and is disposed above and supported on the double top plate and is secured to a truss supporting a plurality of roof system elements wherein the first and second bolts extend vertically through the truss bracket assembly, the double top plate, and the upper base plate to tie the roof system elements to the structural column and to the foundation.

12. The structure anti-torsion device of claim 9, wherein the telescopically adjustable column is received in an interior cavity created in the lower end of the structural column.

13. The structure anti-torsion device of claim 9, wherein the upper base plate includes a column received in the upper end of the structural column.

14. The structure anti-torsion device of claim 13, wherein the column includes multiple apertures defining multiple adjustment positions, such that a fastener or pin received through one of the apertures and the upper end of the structural column fixes the structural column at one of the adjustment positions.

15. The structure anti-torsion device of claim 9, further including a second structural column positioned in vertical alignment with and above the structural column to connect a second floor to a first floor of the wall construction, the second structural column connected to the structural column using a bolted connection having first and second extended length bolts connecting the upper base plate of the structural column to a second structural column lower base plate creating a continuous vertical load path of both the structural column and the second structural column.

16. The structure anti-torsion device of claim 9, wherein the fasteners include large head fasteners adapted to prevent pullout of the large head through the sheeting.

17. The structure anti-torsion device of claim 16, wherein each of the fasteners include washer adapted to prevent pull-out of a head of the fastener through the sheeting.

18. The structure anti-torsion device of claim 9, wherein the fasteners are spaced along a length of the structural column.

19. A method for using a structure anti-torsion device, the anti-torsion device including a structural column having a planar surface, an upper base plate, and a lower base plate, the method comprising:
positioning the structural column between adjacent studs of a structural stud wall construction having the structural column oriented vertically between the studs and the planar surface of the structural column aligned parallel with and flush to an outside face of the adjacent studs, the upper base plate, and the lower base plate;
fastening a lower end of the structural column to the lower base plate;
resting the lower base plate on a wall construction bottom plate;
orienting the lower base plate such that a pair of anchor bolts secured to a foundation extend through the bottom plate and the lower base plate;
fastening the pair of anchor bolts to the lower base plate;

fixing a telescopically adjustable column to the lower base plate, the telescopically adjustable column having multiple apertures;

extending a fastener through an aperture of the structural column and through one of the apertures of the telescopically adjustable column to adjust a height of the structural column and to prevent axial rotation of the structural column;

bolting an upper end of the structural column using first and second bolts to the upper base plate, the first and second bolts cooperating through the upper base plate to connect the upper base plate to a double top plate of the wall construction such that the double top plate is connected by the upper base plate, the structural column, and the lower base plate to the foundation; and positioning wall siding in an abutting relationship with the planar structural column, the adjacent stubs, the upper base plate, and the lower base plate so that the wall siding is flush to the planar surface of the structural column and the outside face of the adjacent stubs, the upper base plate, and the lower base plate; and fastening the wall siding to the structural column with multiple fasteners that are received in multiple holes defined by the planar surface of the structural column.

20. The method of claim 19, further including oppositely positioning the anchor bolts with respect to a structural column longitudinal central axis to resist axial rotation of the structural column.

21. A structure anti-torsion device, comprising:
a structural column, the structural column positioned between adjacent studs of a structural stud wall construction and oriented vertically between the studs;
a lower base plate which rests on a bottom plate of the wall construction;
a pair of anchor bolts secured to a foundation and extending through the bottom plate and the lower base plate and fastened to the lower base plate;
a telescopically adjustable column fixed to the lower base plate and having multiple apertures, one of the multiple apertures receiving a fastener also received in an aperture created in a lower end of the structural column perpendicular to an axis of the structural column thereby providing for height adjustment of the structural column;
an upper base plate connected to the structural column that abuts and is connected to a double top plate of the wall construction;
a wall siding supported on the structural column wherein the structural column has a planar surface that at any adjusted position of the structural column is aligned parallel with and flush to each of: a face of the adjacent studs, the wall siding, a portion of the lower base plate, and a portion of the upper base plate, such that no portion of the upper and lower base plates protrude beyond the planar surface of the structural column and the wall siding abuts against the planar surface and each of the face of the adjacent studs, the portion of the lower base plate, and the portion of the upper base plate; and
wherein the planar surface of the structural column defines multiple holes that receive multiple fasteners to fasten the wall siding to the planar surface of the structural column.

22. The structure anti-torsion device of claim 21, wherein an upper end of the structural column is bolted using first and second bolts to the upper base plate, the first and second bolts cooperating through the upper base plate to connect the upper base plate to a double top plate of the wall construction such that the double top plate is connected by the upper base plate, the structural column, and the lower base plate to the foundation with the wall siding also abutting against the double top plate.

* * * * *